United States Patent
Kang et al.

(10) Patent No.: US 7,136,746 B2
(45) Date of Patent: Nov. 14, 2006

(54) APPARATUS AND METHOD FOR TESTING PERFORMANCE OF MOBILE STATION HAVING GPS FUNCTION

(75) Inventors: Do-Woo Kang, Gunpo-si (KR); Hun-Taek Han, Seoul (KR); Tae-Sook Yoon, Incheon (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 10/603,804

(22) Filed: Jun. 26, 2003

(65) Prior Publication Data

US 2004/0006444 A1    Jan. 8, 2004

(30) Foreign Application Priority Data

Jun. 26, 2002   (KR) ............................. 2002-36001

(51) Int. Cl.
    *G01C 21/26*   (2006.01)
(52) U.S. Cl. ................ 701/201; 701/29; 701/213; 701/215; 342/357.06; 342/357.12
(58) Field of Classification Search ........... 701/213, 701/29, 201, 215; 342/357.06, 357.09, 357.1, 342/357.12; 455/423–425, 561, 67.1; 379/10.03, 379/406.01, 420.01, 15.01
See application file for complete search history.

(56) References Cited

U.S. PATENT DOCUMENTS

| | | | | |
|---|---|---|---|---|
| 4,591,671 | A * | 5/1986 | Pinede et al. | 379/27.01 |
| 5,858,628 | A * | 1/1999 | Yoshida et al. | 430/338 |
| 6,011,830 | A * | 1/2000 | Sasin et al. | 379/10.03 |
| 6,118,982 | A * | 9/2000 | Ghisler et al. | 455/67.14 |
| 6,308,065 | B1 * | 10/2001 | Molinari et al. | 455/424 |
| 6,400,965 | B1 * | 6/2002 | Phillips et al. | 455/558 |
| 6,429,808 | B1 * | 8/2002 | King et al. | 342/357.02 |
| 6,493,425 | B1 * | 12/2002 | Abe | 379/1.01 |
| 6,625,448 | B1 * | 9/2003 | Stern | 455/425 |
| 6,641,045 | B1 * | 11/2003 | Kuriyama | 235/472.01 |
| 6,754,509 | B1 * | 6/2004 | Khan et al. | 455/556.1 |
| 6,774,795 | B1 * | 8/2004 | Eshelman et al. | 340/573.1 |
| 6,826,473 | B1 * | 11/2004 | Burch et al. | 701/207 |
| 6,891,803 | B1 * | 5/2005 | Chang et al. | 370/252 |
| 2002/0022943 | A1 * | 2/2002 | Lapie | 702/183 |
| 2003/0045281 | A1 * | 3/2003 | Rimoni | 455/424 |
| 2003/0148761 | A1 * | 8/2003 | Gaal | 455/423 |
| 2003/0156549 | A1 * | 8/2003 | Binder | 370/252 |
| 2004/0058652 | A1 * | 3/2004 | McGregor et al. | 455/67.13 |
| 2004/0193961 | A1 * | 9/2004 | Zheng et al. | 714/38 |
| 2004/0203726 | A1 * | 10/2004 | Wei | 455/423 |
| 2004/0204191 | A1 * | 10/2004 | Raviv | 455/575.1 |

* cited by examiner

FOREIGN PATENT DOCUMENTS

KR     2000-286999     10/2000

OTHER PUBLICATIONS

Korean Office Action, dated Oct. 28, 2004, citing the above reference.

*Primary Examiner*—Gertrude A. Jeanglaude
(74) *Attorney, Agent, or Firm*—Fleshner & Kim, LLP

(57) ABSTRACT

An apparatus for testing a performance of a mobile station having a global positioning system (GPS) function including a test block having test commands and a test user interface for testing the performance of the mobile station. The test block and test interface are including within the mobile station. Further, the apparatus tests the performance of the mobile station by operating the test block driven through the test user interface.

18 Claims, 5 Drawing Sheets

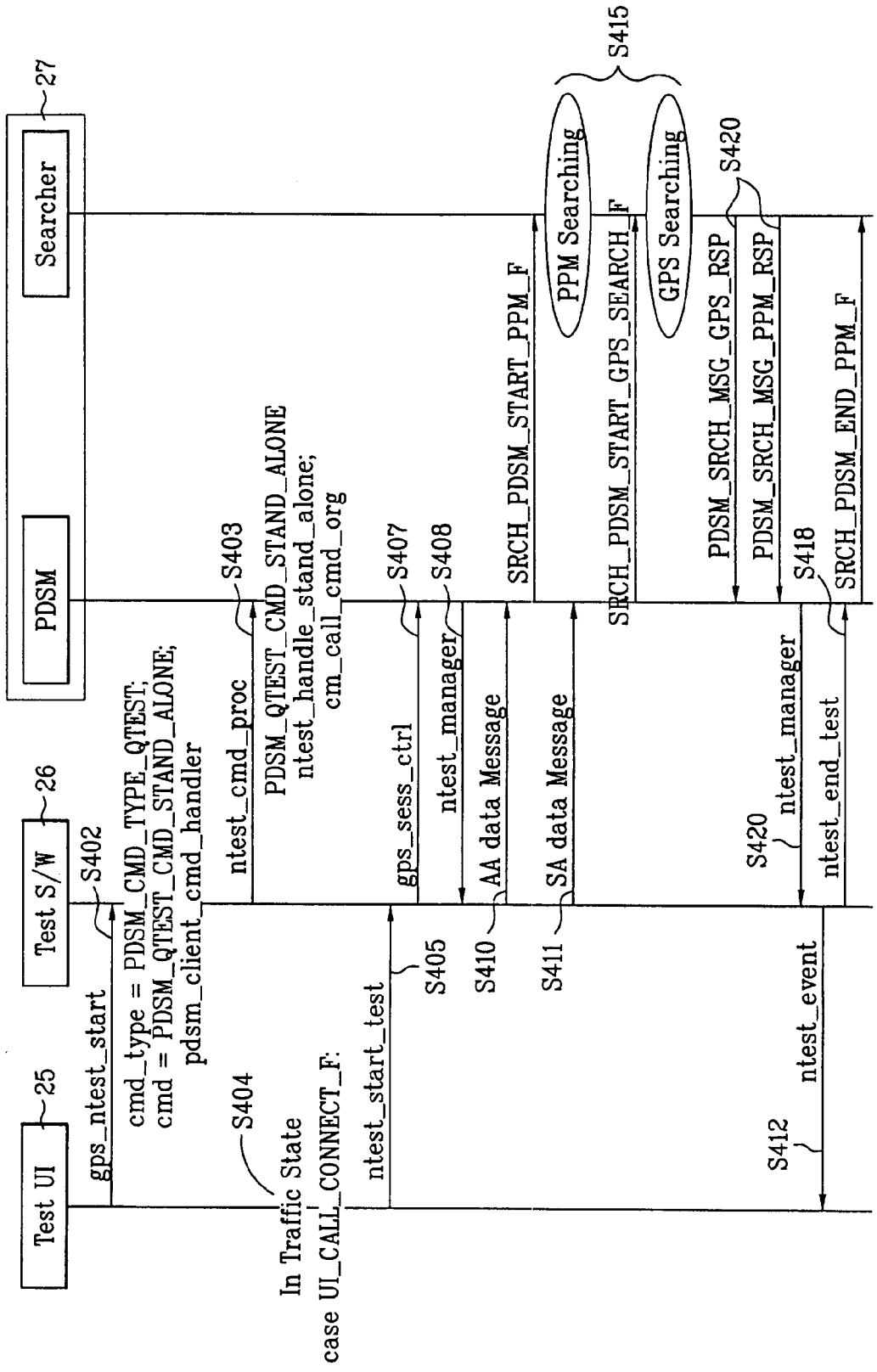

APPARATUS AND METHOD FOR TESTING PERFORMANCE OF MOBILE STATION HAVING GPS FUNCTION

CROSS-REFERENCE TO A RELATED APPLICATION

This application claims the benefit of the Korean Application No. P2002-36001 filed on Jun. 26, 2002, which is hereby incorporated by reference.

BACKGROUND OF THE INVENTION

1. Field of the Invention

The present invention relates to an apparatus and method for testing performance of a mobile station having a global positioning system function.

2. Discussion of the Related Art

Currently, there has been a great growth in the development and application fields of information on communication related techniques using a mobile station, and anyone among the fields corresponds to the mobile station adopting the GPS that is a position information collection system using a satellite communication.

The "gps One" technology of Qualcomm Company is for tracking the position of a code division multiple access (CDMA) mobile station having the gpsOne function mounted therein with a hybrid type having a combination of functions of the GPS and a network based location termination technology. Further, the GPS tracks the position of a GPS receiver on the ground by measuring the time required for a GPS satellite signal to reach the GPS receiver and the network based location determination technology tracks the position of the mobile station by measuring the time required for a CDMA base station signal to reach the mobile station.

According to the hybrid type of technology, a result of a GPS code phase lock is measured from a result of a CDMA code phase lock, and then transmitted to a position determination equipment (PDE). Thus, a resultant position of the corresponding mobile station, which is calculated by the PDE, is used to match a necessary application.

For a purpose of test at stages of development and mass production of a terminal having a mobile station modem (MSM) 3300/5100 series mounted thereon for supporting the gpsOne technology of Qualcomm Company is recommended the technical document CL93-V2244-1 (2002.3.14.) of Qualcomm Company.

The test proposal of the Qualcomm Company as described above corresponds generally to a test for estimating the GPS RF path performance. This hardware performance test may be performed with a relatively inexpensive and simple manner, and thus may be applied to a test of produced samples and mass production prior to an engineering sampling (E/S) stage.

Items of the proposed test do not refer to an end-product based performance such as a positional accuracy, stability of position confirming service, required time, etc., but refer to hardware level performance such as a GPS RF path gain line-up, a GPS RF path loss, a Doppler frequency shift, time calibration number, etc. They may be applied to the development and mass production test of the gpsOne CDMA mobile station adopting an MSM chip.

However, the conventional apparatus and method for testing of the performance of the mobile station having the GPS has the following problems.

The conventional test method requires a long time for once performing the whole tests, and a complicated test equipment.

For example, 8 hours or more are required for the whole tests of 6 items per target network. Also, for a mobile station with a tri-band mode (DCN: 900 MHz, PCS:1.5 GHz, GPS:1800 MHz), 16 hours are required for performing the whole tests of personal communication system (PCS) and digital cellular network (DCN).

For further example, if the number of tests is increased in order to secure the reliability, more than 100 hours will be required. Especially, in order to test of the performance of the MSUT using a diagnostic monitoring device during the test of a mass production, about 7 minutes at maximum is required as the operation time of the MSUT in measuring the GPS code phase as many as 100 times after establishing a traffic channel with respect to only one item of a 'sensitivity without Sensitivity Assist'.

SUMMARY OF THE INVENTION

An object of the present invention is directed to an apparatus and method for testing a performance of a mobile station having a GPS function that substantially obviates one or more problems due to limitations and disadvantages of the related art.

Another object of the present invention is to provide an apparatus and method for testing a performance of a mobile station having a GPS function that may simplify a test equipment.

Still another object of the present invention is to provide an apparatus and a method for testing a performance of a mobile station having a GPS function that may reduce a test time.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for testing performance of a mobile station having a global positioning system (GPS) function includes a test blcok and a test user interface for testing a performance of the mobile station, wherein the apparatus tests the performance by operating the test block driven through the test user interface.

Preferably, the apparatus further includes a radio frequency (RF)/intermediate frequency (IF) block for converting GPS (Global Positioning System) RF (radio frequency) signal and the CDMA (Code Division Multiple Access) RF (radio frequency) signal to intermediate frequency/baseband signals, a keypad/display for inputting a user test command from a user thereon and displaying a test result respectively, a GPS (Global Positioning System) search block for generating status information of the mobile station by using the baseband signals, an acquisition assistance (AA) data message, and a sensitivity assistance (SA) data message from the test block, the test block for generating the acquisition assistance (AA) data message and the sensitivity assistance (SA) data message with a first test command from the test user Interface operated on the keypad or through a diagnostic monitoring device, generating a second test command for controlling the GPS search block by using the status information, and generating test status information based on the test result, the test user interface operated by the user on the keypad or through the diagnostic monitoring device and transferring the test status information to the display or the diagnostic monitoring device.

In another aspect of the present invention, a method for testing performance of a mobile station having a global positioning system function, includes the steps of setting set values according to a test type by an input through a keypad of the mobile station, if an idle mode is in an off state, entering a traffic state, if a currently proceeding test is for the first time, controlling a start of a global positioning system (GPS) operation, sending the acquisition assist (AA) data message and counting a number of tests in a first state, performing a pilot phase measurement (PPM) search operation and a global positioning system (GPS) search operation using the AA data message and a sensitivity assist data message in a second state, repeatedly testing each test item of the performance by using the performed result in a predetermined number of t he tests, and displaying the repeated test results.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram illustrating the construction of reference parameters according to the operation of the MS and UI according to a preferred embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
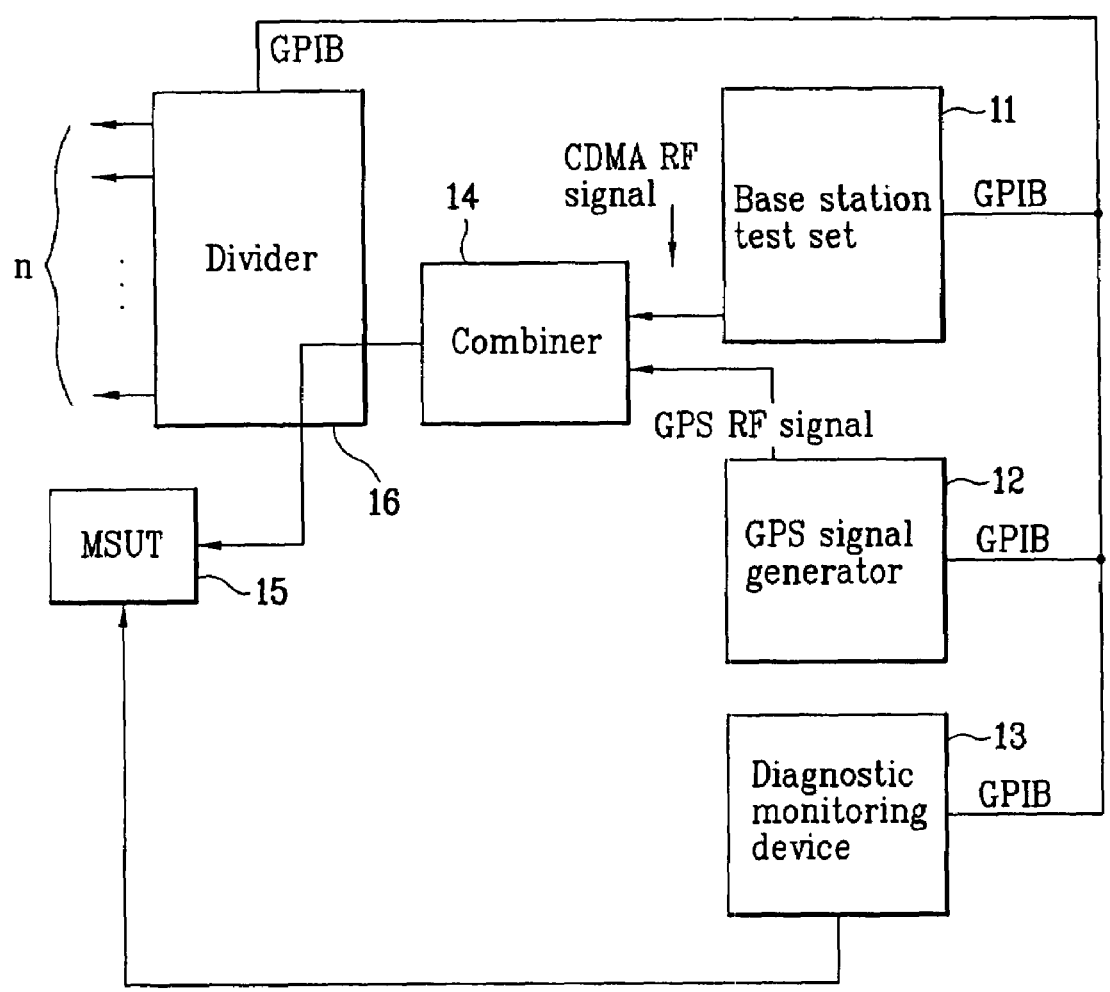
FIG. 1 is a diagram illustrating the construction of a conventional test apparatus of a performance of a mobile station having the GPS mounted therein.

FIG. 1 is a diagram illustrating the construction of a test equipment for testing a performance of a mobile station having the GPS mounted therein.

Figure 2:
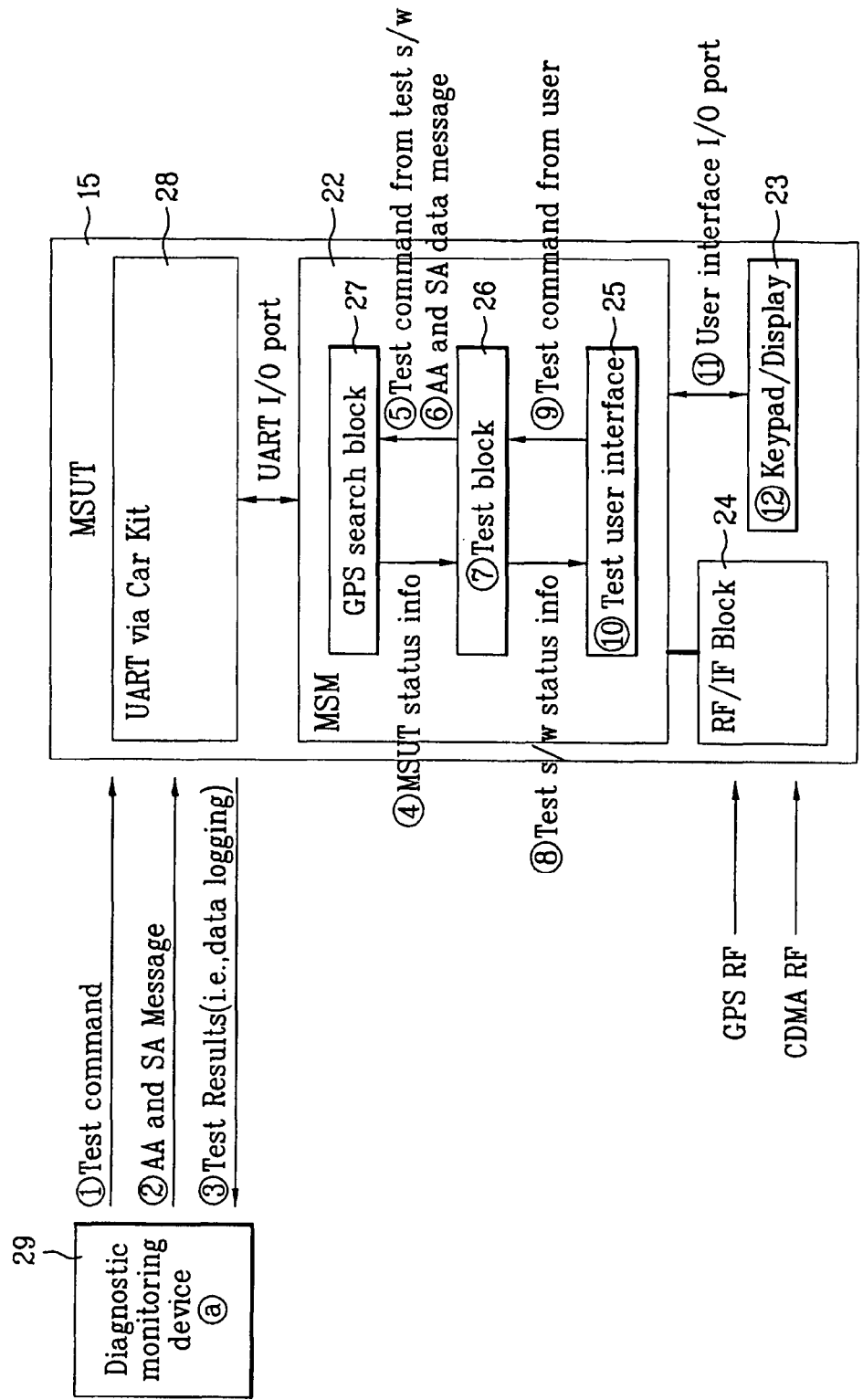
FIG. 2 is a diagram illustrating the construction of a performance test apparatus of a mobile station having the GPS mounted therein.
Figure 3:
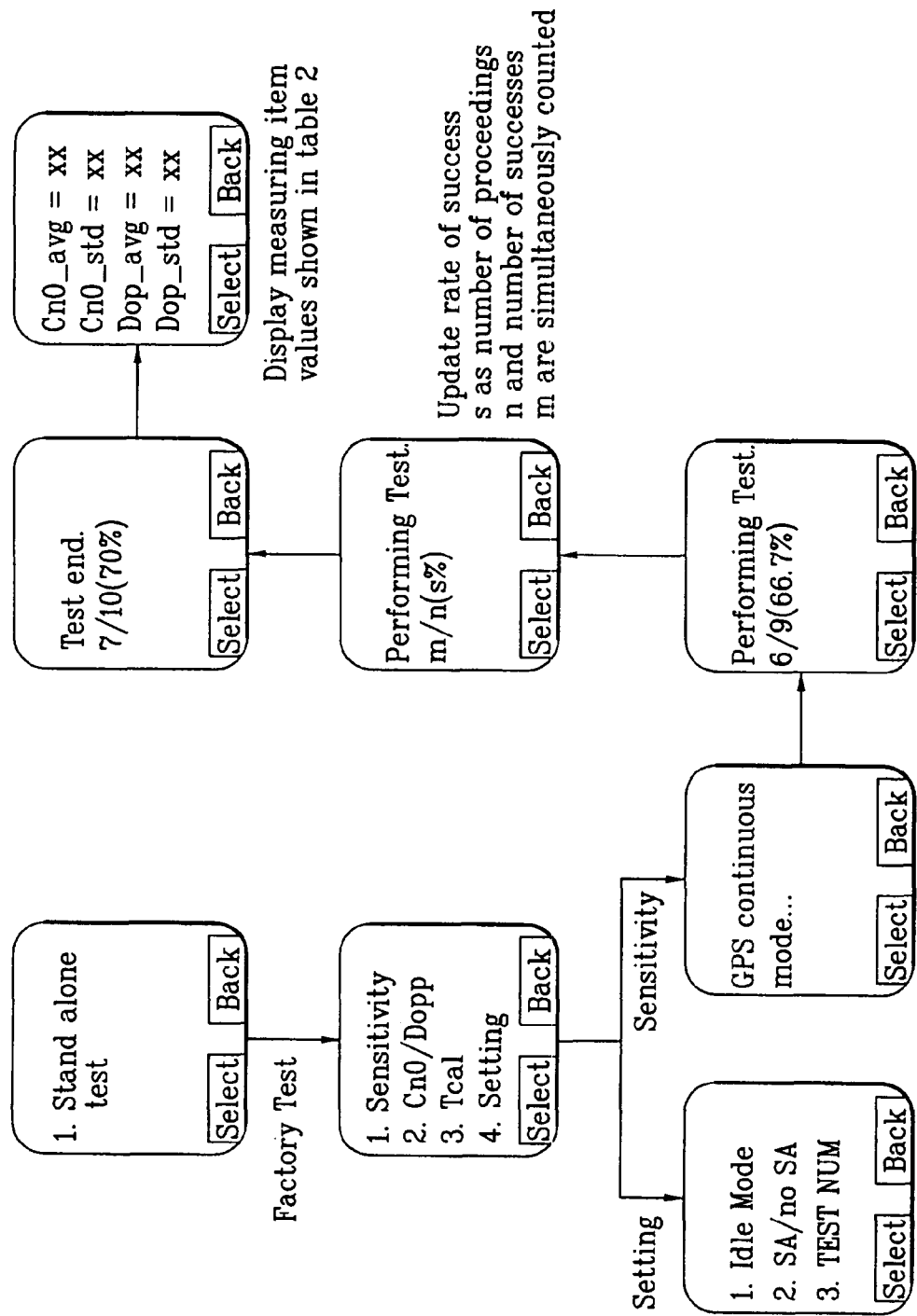
FIG. 3 is a diagram illustrating the construction of a UI for driving a MSUT according to a preferred embodiment of the present invention.

FIG. 2 is a detailed diagram illustrating the construction of a performance test apparatus of a mobile station having the GPS mounted therein. FIG. 3 is a diagram illustrating the construction of a User Interface for driving a MSUT according to a preferred embodiment of the present invention.

Referring to FIGS. 1–3, the test apparatus includes a GPS signal generator SG 12, a base station test set 11, a mobile station under a test (hereinafter, MSUT) 15, a diagnostic monitoring device 29, and a power combiner 14. At this time, the GPS signal generator SG 12 generates a Global Positioning system (GPS) RF signal, and the base station test set 11 generates a Code Division Multiple Access (CDMA) RF signal. The MSUT 15 has a test block 26 and a test user Interface 25 which drives the test block 26 according to an operation of the test user Interface 25, and the test block 26 testing a performance of the MSUT 15 by using the CDMA RF signal and the GPS signal. Then, the diagnostic monitoring device 29 is optionally coupled to the MSUT 15 for operating the test user Interface 25, or displaying a test result of the test block 26 operated by the test user Interface 25. The power combiner 14 combines paths of the GPS RF signal and the CDMA RF signal, and inputting the combined signals to the MSUT 15.

At this time, the frame clock of the GPS signal generator 12 is synchronized with that of the base station test set 11.

Also, the GPS RF signal inputted from the GPS signal generator 12 through the at least one channel has a predetermined type of a data format to match a format of 'data acquisition assist (AA)' and 'sensitivity assist (SA)' data messages with a predetermined communication protocol (e.g., an IS801 protocol).

The present invention reduces the time required for the performance test of the mobile station having the GPS mounted therein and is supported by the Qualcomm chip. According to a preferred embodiment of the present invention the test block 26 for testing the performance of the MSUT 15 and the test user interface (UI) 25 for the performance test are constructed within the mobile station under test (MSUT) 15. It is possible to obtain the test block 26 and the test user Interface 25 as a software mode. That is, the MSUT 15 comprises a record means for storing a program having at least one module for operating the test block 26 and the test user Interface 25 as the software mode.

Specifically, according to a preferred embodiment of the present invention, the test proceeding of the MSUT 15 is not instructed and monitored by the diagnostic monitoring device 29, but by the MSUT 15 including the internal test block 26, thereby a test equipment required for the test proceeding is simplified and time required for the test is reduced.

Referring to FIG. 2, the MSUT 15 includes a radio frequency (RF)/intermediate frequency (IF) block 24 for receiving the GPS RF signal and the CDMA RF signal, converting the RF signals to intermediate frequency/baseband signals, and transferring the baseband signals to a mobile station modem (MSM) 22, a keypad/display 23 for inputting a test command from the user thereon and displaying a test result respectively, the mobile station modem (MSM) 22 for testing a performance of the MSUT 15 using the baseband signals according to a test command from the user or the diagnostic monitoring device 29 and transferring a test result to the diagnostic monitoring device 29 or the display 23, and a universal asynchronous receiver/transmitter (UART) via carkit 28 for inputting/outputting the test command or the test result between the diagnostic monitoring device 29 and the MSM 22.

The mobile station modem (MSM) 22 includes a GPS search block 27 for generating status information of the MSUT 15(④) by using the baseband signal, an acquisition assistance (AA) data message, and a sensitivity assistance (SA) data message from the test block 26, the test block 26(⑦) for generating the acquisition assistance (AA) data message and the sensitivity assistance (SA) data message with a first test command from the test user Interface 25 operated on the keypad 23 or through the diagnostic monitoring device 29, generating a second test command for controlling the GPS search block 27, by using the status information of the MSUT 15 from the GPS search block 27, and outputting test status information(⑧) based on the test result through the test user interface 25(⑩), a test user Interface 25 for receiving the test status information from the test block 26(⑦), outputting the test status information to the display 23 or the diagnostic monitoring device 29 through a user interface output port (⑪), and transferring the first test command from the keypad 23 or the diagnostic monitoring device 29 to the test block 26(⑨).

A test application of the diagnostic monitoring device 29 may be removed, or may be used in case of need. The test command(ⓒ) from the user through the diagnostic monitoring device 29, AA/SA messages(ⓓ), data logging in response to the test result(∠), etc., from the diagnostic monitoring device 29 are transmitted and/or received through the UART 28 of the MSUT 15. The performance test of the MSUT 15 having the test block 26 is driven by manipulation (e.g., manipulation by the user on the keypad 23 or diagnostic monitoring device 29) of the dedicated user interface. The MSUT 15 performs the test according to the predetermined setting reference and estimates the test result by the internal test block 26 without transmitting the test result through the UART 28 to an external, and displays the estimation result through a diagnostic monitoring device 29 or a display 23 (e.g., liquid crystal display (LCD)) of the MSUT 15.

At this time, the detailed operation and setting of the test user interface are as follows.

For the performance test through an air path, it is necessary to locate the MSUT 15 inside the shield box, and at this time, the test block 26 is driven by either one of the two following methods.

The first method is to drive the test block 26 of the MSUT 15 by manipulating the test user interface 25 by software through the diagnostic monitoring device 29.

The second method is to drive the test block 26 of the MSUT 15 by giving the test command from the diagnostic monitoring device 29 directly to the MSUT 15 without using the test user interface 25.

In the first method, the test block 26 may be driven without an additional work, but in the second method, a separate software may be needed.

Also, the test result may be displayed based on a measurement-monitoring message outputted to the diagnostic monitoring device 29, not through the display of the MSUT 15, and in this case, a separate software may also be needed.

The MSUT 15 having a test block 26 according to the preferred embodiment of the present invention as constructed above may be modified to various combinations according to a test purpose and a test environment.

TABLE 1

| Necessary Function Items | Section Classification and Procedures and/or Element required for each Section | | |
|---|---|---|---|
| Test software Driving | DM | Test block | Test UI |
| Keypad Manipulation |  | ④, ⑤, ⑥, ⑦ | ⑧, ⑨, ⑩, ⑪, ⑫ |
| test UI Manipulation by DM | ⓐ, ① | ④, ⑤, ⑥, ⑦ | ⑧, ⑨, ⑩ |
| Trans. from DM to MSUT | ⓐ, ① | ④, ⑤, ⑥, ⑦ |  |
| Test Result Display | DM | Test block | Test UI |
| Display of MSUT |  | ④, ⑤, ⑥, ⑦ | ⑧, ⑨, ⑩, ⑪, ⑫ |
| Display Window of DM | ⓐ, ③ | ④, ⑤, ⑥, ⑦ |  |

The test is performed by using at least two function items among the necessary function items, at this time, procedures and/or elements of the at least two necessary function items selected for the test are or-gated.

For example, in case that the test block 26 is driven by the keypad manipulation and a display means of the test result is a display window of the diagnostic monitoring device 29, on assumption that the two necessary function items are used, the test and the display of the test result are performed with procedures and/or elements of ③, ④, ⑤, ⑥, ⑦, ⑧, ⑪, ⑨, ⑩, ⑫ through combination of all the procedures and/or elements required for the necessary function items in Table 1.

As described above, in the present invention, the number of the procedures and/or elements required for testing performance of the MSUT 15 may be 15 at maximum to 6 at minimum.

Specifically, ⓐ denotes the diagnostic monitoring device 29, ① a test command from the diagnostic monitoring device 29, ② an AA/SA message from the diagnostic monitoring device 29, ③ a data logging in response to the test result, ④ status information of a MSUT 15, ⑤ a test command from the test block 26, ⑥ an AA/SA data message from the test block 26, ⑦ the test block 26, ⑧ test status information from the test block 26, ⑨ a test command from a user, ⑩ test user interface 25, ⑪ a user interface input/output (I/O) port, and ⑫ a keypad/display 23 in the MSUT 15, respectively.

As shown in Table 1, in case of driving the test block 26 by manipulation of the user on the keypad 23, the performance test of the MUST 15 is performed with the procedures and/or elements of ④, ⑤, ⑥, ⑦, ⑧, ⑨, ⑩, ⑪, ⑫, and in case of driving the test block 26 by manipulating the test user interface (UI) 25 of the MSUT 15 using the diagnostic monitoring device 29, the driving is performed with the procedures and/or elements of ⓐ, ①, ④, ⑤, ⑥, ⑦, ⑧, ⑨, ⑩.

Also, in case of driving the test block 26 by transmitting the test command from the diagnostic monitoring device 29 to the MSUT 15, the performance test of the MUST 15 is performed with the procedures and/or elements of ⓐ, ①, ④, ⑤, ⑥, ⑦.

Also, in case of using the display means of the MSUT 15 as the display means of the test result, the test result is displayed with the procedures and/or elements of ④, ⑤, ⑥, ⑦, ⑧, ⑨, ⑩, ⑪, ⑫. In case of using the display window of the diagnostic monitoring device 29, the test result is displayed with the procedures and/or elements of ⓐ, ③, ④, ⑤, ⑥, ⑦.

Meanwhile, the construction and definition of the menus of the test UI are as follows.

TABLE 2

| Main Menu | Sub Menu | Menu Definition |
|---|---|---|
| 1. Sensitiv | | Sensitivity Test execution |
| 2. Cn0/Dopp | | C/N0 Calibration and Doppler Estimation test execution |
| 3. Tcal | | Time Calibration Test |
| 4. Settings | 1. Idle mode OFF/ON | Idle mode or traffic channel selection, default; OFF |
| | 2. SA/no SA, no SA/SA | With SA or without SA Designation, default; no SA |
| | 3. TEST NUM (Proceeding No. | Designation of number of Repetitions for each test |

The test user interface 25 for driving the test block 26 of the MSUT 15 according to a preferred embodiment of the present invention is located on a test mode menu list to which an access is intercepted from a general user.

First, referring to FIG. 3, if a "Factory Test" menu displayed on the LCD display window of the MSUT 15 is selected, the main menus of "1.Sensitivity", "2.CnO/Dopp", "3.Tcal", and "4.Settings" as shown in Table 2 are displayed in order.

In this state, if "4.Settings" is selected, the sub menus of "1.Idle Mode", "2.SA/no SA", and "3.TEST NUM" are displayed if "1.Sensitivity" is selected, the present mode of the MSUT 15 is changed to a GPS continuous mode. In this operating mode, the MSUT 15 updates a rate of success 's' (s=m/n*100) continuously, wherein 'n' is a number of proceedings of a performance test of the MSUT 15 and 'm' is a number of successes of the performance test.

If the test of one selected main menu is completed, the measured values of the selected main menu are finally displayed. Another main menu ("2.CnO/Dopp" or "3.Tcal") is selected, and the test is successively performed.

Herein, "CnO" means a ratio of a GPS RF signal power and noise signal power at a base band. 'Dopp' indicates a Doppler frequency shift. 'Tcal' indicates a time calibration number.

If the test is completed, the measured values of test items as shown in Table 2 are finally displayed.

Among the measured values in shown in FIG. 3, "CnO_avg" denotes the average of "CnO" values, and "CnO_std" denotes the standard deviation of the "CnO" values.

Also, "Dop_avg" denotes the average of the Doppler tests, and "Dop_std" denotes the standard deviation of the Doppler tests.

The test mode menu list of the user interface as described above is described as one preferable embodiment, and it is possible to adopt any different menu list and a display method.

The operation of the performance test of the GPS mobile station according to a preferable embodiment of the present invention will be explained in detail.

Figure 4:
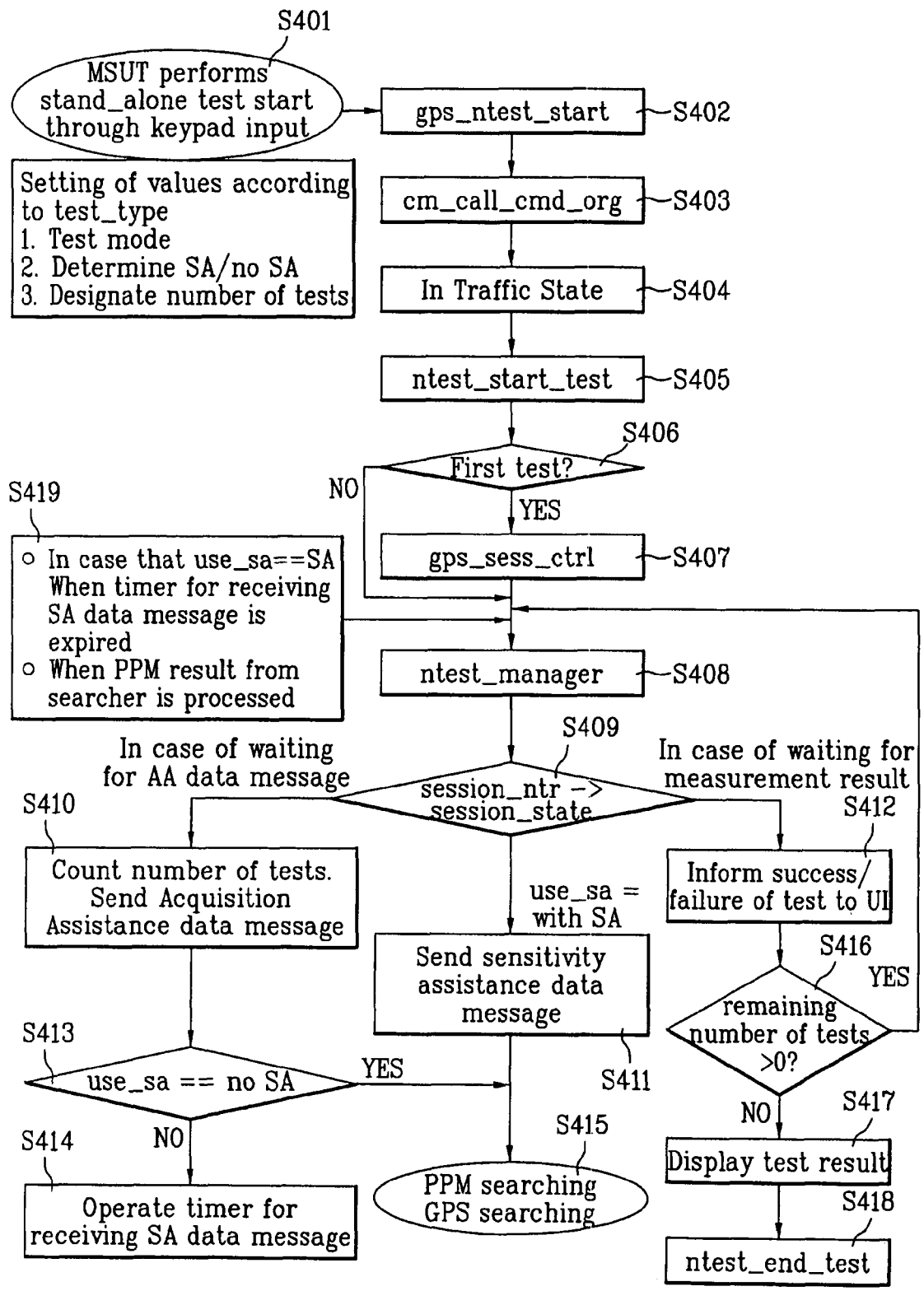
FIG. 4 is a flowchart illustrating a performance test method of a mobile station having the GPS function according to a preferred embodiment of the present invention.

FIG. 4 is a flowchart illustrating a performance test method of a mobile station having the GPS function according to a preferred embodiment of the present invention. FIG. 5 is a diagram illustrating the construction of reference parameters according to the operation of the MSUT and UI according to a preferred embodiment of the present invention.

First, The MSUT 15 performs an independent test (stand_alone test start) by a user's manipulation on a keypad (step S401).

By the manipulation on the keypad, a test mode and the number of tests are designated. For example, the test mode is designed whether to proceed a test with SA.

If the performance test of the MSUT 15 having the GPS function (hereinafter, GPS mobile station) starts according to an input on the keypad (gps_ntest_start) (step S402), and the idle mode is off in the test mode set after an origination call message is transmitted from the MSUT 15 to a base station for establishing a communication path (cm_call_cmd_orig) (step S403), the test mode of the MSUT 15 is in a traffic state (S404).

If the performance test starts after entering the traffic state (ntest_start_test) (step S405), it is judged whether the currently proceeding test is for the first time or not (step S406)

The test block 26, receiving the user test command through the test user Interface 25, or the direct test command from the diagnostic monitoring device 29, is connected to ntest_manager module. Also, the ntest_manager module provides the second test command for controlling the GPS search block 27 from the test block 26 to the GPS search block 27 (S407). Then, the test block 26 transmits the AA data message to the Position Determination Session Manager (PDSM) for the GPS search, and starts to count the number of tests (S410). In case the user designates the test mode as 'no SA', the GPS search block 27 searches a Pilot Phase Measurement (hereinafter, PPM) signal. (S415). However, if the user designates the test mode as 'with SA', the GPS search block 27 drives a timer for receiving the SA data message (S414). Before the timer expires, the test block 26 transmits the SA data message to the GPS search block 27 (S411). Then, the GPS search block 27 searches GPS signal with the AA and SA data messages.

The ntest_manager module provides the results of the PPM and the GPS signal search from the GPS search block 27 to the test block 26 as the status information of the MSUT 15 (S420). The test block 26 repeatedly tests the performance of the MSUT 15 with the status information of the MSUT 15 in a predetermined number of tests, and analyzes the test result. The test items of the test are shown in Table 2. Then, the test block 26 provides the analyzed test result to the test user Interface 25 (S412 ). At this time, if there are the remaining test items, the test of another item is repeatedly performed according to the afore-mentioned method. However, in case there is no remaining test item, the display 23 or the diagnostic monitoring device 29 displays the analyzed test results of the test items through the test user Interface 25 (S417). Then, the test block 26 completes the test process (S418).

As described above, the apparatus and method for testing the performance of a mobile station having the GPS function according to the present invention can solve the problems involved in the prior art in that since the diagnostic monitoring device 29 cannot recognize the test proceeding state of the MSUT 15, the next process is performed after a proper delay time.

That is, it may solve the problems in that since the diagnostic monitoring device 29 waits for until the delay time even if the internal performance test of the MSUT 15 is completed, the test time is unnecessarily lengthened.

Also, since the IS-801 data message transmitted through the car kit between the diagnostic monitoring device 29 and the MSUT 15 is stored inside the MSUT 15, the test time delay required for the data transmission may be eliminated.

As described above, the apparatus and method for testing the performance of the mobile station having the GPS function according to a preferred embodiment of the present invention, in which the test block and the test user interface (UI) are constructed in the MSUT, have the following effects.

First, the time required for the GPS performance test of the mobile station having the GPS function can be reduced by 50% in comparison to the prior art by adopting the Qualcomm MSM chip.

Second, since the number of tests becomes greater than that of a competing company due to the reduction of the test time, it is possible to improve the reliability of products.

Third, since the test is performed through a user's manipulation on a keypad of the MSUT and thus the use of a personel computer including the diagnostic monitoring device is not required, the construction of the test equipment is simplified and the test cost can be reduced.

Fourth, since the test can be performed by driving the user interface (UI) of the MSUT through the DM even though the test is performed in a state that the MSUT is put in the shield box for the air test or shielding, the test time is kept to be reduced even if the DM and the MSUT are connected.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. An apparatus for testing a performance of a mobile station having a global positioning system (GPS) function, comprising:
    a conversion block to convert a GPS radio frequency (RF) signal and a Code Division Multiple Access (CDMA) RF signal to baseband signals;
    a GPS search block to generate status information of the mobile station by using the baseband signals, an acquisition assistance (AA) data message, and a sensitivity assistance (SA) data message; and
    a test block including test commands and a test user interface for testing the performance of the mobile station, said test block and test user interface being within the mobile station, the test block generating the acquisition assistance (AA) data message and the sensitivity assistance (SA) data message with a first test command from the test user interface or through a diagnostic monitoring device, generating a second test command for controlling the GPS search block by using the status information, and generating test status information based on a result of the test,
    wherein the apparatus tests the performance of the mobile station by operating the test block driven through the test user interface.

2. The apparatus of claim 1,
    wherein the conversion block comprises a radio frequency (RF)/intermediate frequency (IF) block for converting the GPS RF (radio frequency) signal and the CDMA (Code Division Multiple Access) RF(radio frequency) signal to intermediate frequency/baseband signals; and
    the apparatus further comprising a keypad/display for inputting a user test command for a user thereon and display a test result, and
    wherein the test user interface operated by the user on the keypad or through the diagnostic monitoring device transfers the status information to the display or to the diagnostic monitoring device.

3. The apparatus of claim 1, wherein the test user interface is operated in one of a sensitivity test mode, a GPS signal to noise ratio/Doppler estimation test mode, a time calibration test mode, or a setting mode for setting a circumstance of the test modes.

4. The apparatus of claim 1, wherein the test user interface is included on a test mode menu list which a usual user does not access.

5. The apparatus of claim 1, further comprising a diagnostic monitoring device if the mobile station is located in a shield box.

6. The apparatus of claim 1, wherein the status information relates to a GPS performance test.

7. The apparatus of claim 1, wherein the status information relates to a GPS signal to noise ratio.

8. A method for testing a performance of a mobile station having a global positioning system (GPS) function, comprising:
    setting set values according to a test type by an input through a keypad of the mobile station;
    if an idle mode is in an off state, entering a traffic state;
    if a currently proceeding test is for the first time, controlling a start of a GPS operation;
    sending an acquisition assist (AA) data message and counting a number of tests in a first state;
    performing a pilot phase measurement (PPM) search operation and a GPS search operation using the AA data message and a sensitivity assistance (SA) data message in a second state;
    repeatedly testing each test item of the performance by using a performed result in a predetermined number of the tests; and
    displaying results of the tests,
    wherein when testing a sensitivity, a present mode is changed to a GPS continuous mode to proceed the performance test, a rate of success s is continuously updated (s=m/n*100) as the number n of proceedings and the number m of successes are simultaneously counted, and the updated rate of success is displayed.

9. A method for testing a performance of a mobile station having a global positioning system (GPS) function, comprising:
    initiating the testing of the performance of the mobile station by setting set values according to a test type by an input through a keypad of the mobile station;
    if an idle mode is in an off state, entering a traffic state;
    if a currently proceeding test is for the first time, controlling a start of a GPS operation;
    sending an acquisition assist (AA) data message and counting a number of tests in a first state;
    performing a pilot phase measurement (PPM) search operation and a GPS search operation using the AA data message and a sensitivity assistance (SA) data message in a second state;
    repeatedly testing each test item of the performance by using a performed result in a predetermined number of the tests; and
    displaying results of the tests.

10. The method of claim 9, further comprising:
    judging if a test mode is without SA after the AA data message is sent, and driving a timer for receiving the SA data message if it is judged that SA is to be used; and
    if the test mode is without SA, performing the PPM search operation and the GPS search operation.

11. The method of claim 9, wherein the test type is one of a sensitivity, C/NO and Doppler estimation (CnO/Dopp), and time measurement (Tcal).

12. The method of claim 9, wherein the AA and SA data messages are defined by an IS801 protocol.

13. A mobile terminal, comprising:
- a Global Positioning System (GPS) function configured to determine a position of the mobile terminal;
- a GPS search block to generate status information of the mobile terminal by using baseband signals, an acquisition assistance (AA) data message, and a sensitivity assistance (SA) data message;
- a test block including test commands configured to test a performance of the GPS function, the test block including test commands and a test user interface for testing the performance of the mobile terminal, the test block generating the acquisition assistance (AA) data message and the sensitivity assistance (SA) data message with a first test command from the test user interface or through a diagnostic monitoring device, generating a second test command for controlling the GPS search block by using the status information, and generating test status information based on a result of the test.

14. The mobile terminal of claim 13, further comprising:
- a Graphical User Interface (GUI) configured to drive the test block for testing the performance of the GPS function.

15. The mobile terminal of claim 13, wherein the test block includes a sensitivity test mode, a GPS signal to noise ratio/Doppler frequency shift estimation test mode, a time calibration test mode or a setting mode for setting values of the test modes.

16. The mobile terminal of claim 13, wherein the test block comprises software loaded in a memory of the mobile terminal.

17. The mobile terminal of claim 13, wherein the status information relates to a GPS performance test.

18. The mobile terminal of claim 13, wherein the status information relates to a GPS signal to noise ratio.

* * * * *